INVENTORS
OTTO H. SCHMITT
WINFIELD E. FROMM
WESLEY A. FAILS
IRA L. KASINDORF
BY Blair, Curtis & Hayward
ATTORNEYS INVENTORS
OTTO H. SCHMITT
WINFIELD E. FROMM
WESLEY A. FAILS
IRA L. KASINDORF
BY Blair, Curtis & Hayward
ATTORNEYS Patented June 12, 1951

2,556,556

UNITED STATES PATENT OFFICE 2,556,556

TELEMETERING SYSTEM

Otto H. Schmitt, Minneapolis, Minn., and Winfield E. Fromm, Williston, Wesley A. Fails, Hempstead, and Ira L. Kasindorf, Bronx, N. Y., assignors to Airborne Instruments Laboratory, Inc., Mineola, N. Y.

Application May 25, 1948, Serial No. 29,018

5 Claims. (Cl. 177—351)

This invention relates to telemetering systems and more particularly to the transmission and reception of angular and magnitude information.

In accordance with the present invention polar coordinate data are transmitted by modification of the wave characteristics of a single carrier frequency; accurate relaying of the data being accomplished without the use of precision transmitting and receiving equipment.

Many systems have been proposed for the telemetering of angular information, but all have failed to provide the desired characteristics of accuracy and economy of equipment. For example, it has been proposed to transmit angular information by coding the frequency of a carrier wave in accordance with the angular information to be telemetered. Such a system of frequency modulation requires precision transmission and reception equipment which is expensive to construct and requires continued and skillful maintenance, and relatively complicated apparatus is required for converting the electrical signal into a form suitable for automatic controlling or recording operations.

It has also been proposed to modulate the carrier frequency with an audio signal the frequency of which is coded in accordance with the angular information to be telemetered. Systems of this type also require the use of precision frequency standardization equipment at the transmitting and receiving stations. The electrical information derived from both of these systems requires extensive modification before it can be used for automatic controlling or recording purposes.

In accordance with the preferred embodiment of this invention two voltages derived, for example, from two voltages of a Selsyn system, are used to control the side-band frequencies of a carrier wave. With this arrangement the accuracy of transmission is largely dependent upon the ratio of the side-band frequencies so that absolute frequency standards are not required for either the transmitting or the receiving stations. The three Selsyn voltages are reconstructed at the receiving station and thus may be used readily for control operations. A third frequency may be generated corresponding, for example, to the magnitude data portion of the polar information and transmitted simultaneously on the same carrier.

Accordingly, it is an object of this invention to provide methods and apparatus for telemetering polar information.

It is a further object to provide such a system in which the accuracy of the system is in a large measure independent of the frequency and amplitude stability of the transmitting and receiving equipment.

Still another object is to provide for the transmission of angular information by transmitting a carrier wave modified in accordance with the instantaneous magnitudes of two of the three control voltages of a Selsyn system.

It is another object to provide novel component equipments suitable for use in such a system and having wide utility for other applications.

The invention accordingly consists in the features of construction, combinations of elements, arrangements of parts and methods of operations as will be exemplified in the structures and sequences and series of steps to be hereinafter indicated and the scope of the application of which will be set forth in the following claims.

In this specification and the accompanying drawings, there is shown and described a preferred embodiment of the invention; but it is to be understood that this is not intended to be exhaustive nor limiting of the invention, but on the contrary is given for purposes of illustration in order that others skilled in the art may fully understand the invention and the principles thereof and the manner of applying it in practical use so that they may modify and adapt it in various forms, each as may be best suited to the conditions of a particular use.

SYSTEM OPERATION

Figure 1:
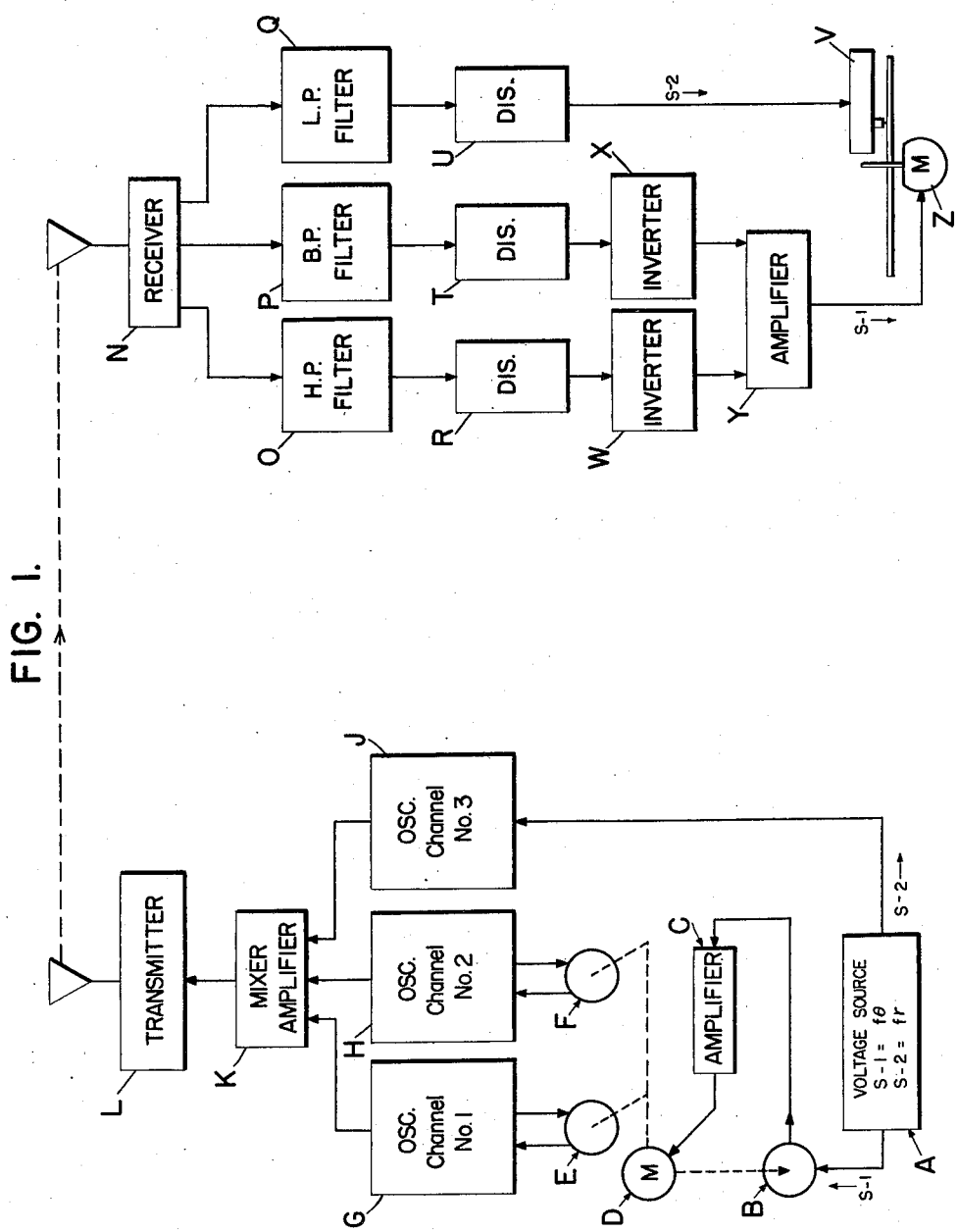
Fig. 1 is a block diagram of a system, constructed in accordance with the present invention, for the telemetering of polar information.

The block diagram of Fig. 1 represents the entire apparatus for telemetering angular information from a Selsyn system, and for simultaneously telemetering corresponding magnitude data so that a complete polar plot may be made automatically at the receiving point. In order to transmit a signal S—1, which is a function of the angle to be relayed, the three alternating voltages from a 60 cycle Selsyn system may be used. These voltages may be taken conveniently from a Selsyn control system, as for example, one which indicates direction, and which may be generated automatically by a gyro-compass system. It is, however, unnecessary to transmit all three of these voltages because, in the usual Selsyn system, the sum of the three voltages is at all times equal to zero. Therefore, knowing the values of any two of the three voltages, the third one can be determined. The signal S—1 is applied to the field windings of a servomotor B. In order to accurately position the rotor of servomotor B, in accordance with the signals S—1, without undesirably loading the voltage source A, the voltage induced in the rotor winding of motor B is applied to an amplifier C the output of which drives a two-phase motor D which accurately positions the rotor of motor B and simultaneously positions two Selsyn motors E and F.

These Selsyn units E and F are connected in the circuits of two variable frequency oscillators G and H, respectively, and control the frequency of these oscillators in accordance with the instantaneous angular position of the armature of motor D. A third oscillator J, also variable in frequency, is controlled by a signal S—2 which may be direct voltage, derived in any suitable manner, the magnitude of which is to be transmitted as part of the polar coordinate information.

The output signals from oscillators G, H, and J, all of which may operate conveniently within the audio frequency range, but which occupy separate frequency channels that do not overlap, are combined in a mixer-amplifier K the output of which is utilized to amplitude modulate a conventional type radio transmitter L.

The transmitted signal is picked up by a conventional type receiver N and, after suitable amplification, is detected and the output signals applied simultaneously to three filter circuits: a high-pass filter O which suppresses the modulation frequencies produced by oscillators J and H but does not appreciably attenuate the frequencies produced by oscillator G, a band-pass filter P which passes only the frequencies produced by oscillator H, and a low-pass filter Q which passes only the frequencies produced by oscillator J. These filters are connected, respectively, to discriminators R, T, and U, each of which delivers direct voltage having a magnitude that is a function of the modulation frequency applied to the particular discriminator, and which is substantially independent of the magnitude of the modulation frequency.

The output voltages of discriminators R and T are applied to inverter circuits W and X, respectively, each of which produces an alternating voltage of predetermined constant frequency and having a magnitude which is a function of the direct voltage delivered by the corresponding discriminator.

These alternating voltages are applied to the input circuit of an amplifier Y which amplifies the two voltages and which produces automatically a third voltage corresponding to the third component of the original signal S—1 and which was not transmitted. This signal is applied to a servo control motor Z which may control, for example, the angular position of a turntable of an automatic recording device.

The signal from the low-pass filter Q passes through a similar discriminator U and the direct voltage therefrom, the magnitude of which is a function of the frequency of oscillator J, is applied to a suitable control circuit, for example, the automatic recording device mentioned above, to control the radial position of a recording pen V.

Thus, data collected at one point may be recorded accurately in polar coordinate form at a remote location and the transmission may be accomplished without the necessity for precision transmission and receiving equipment. Thus the transmitter L and the receiver N may be conventional types such as are used ordinarily for communication purposes, with no unusual stability requirements either as to power, sensitivity or frequency, because the data recorded at the remote location are independent of these factors.

TRANSMISSION EQUIPMENT

Adjustment of synchro units E and F

Figure 2:
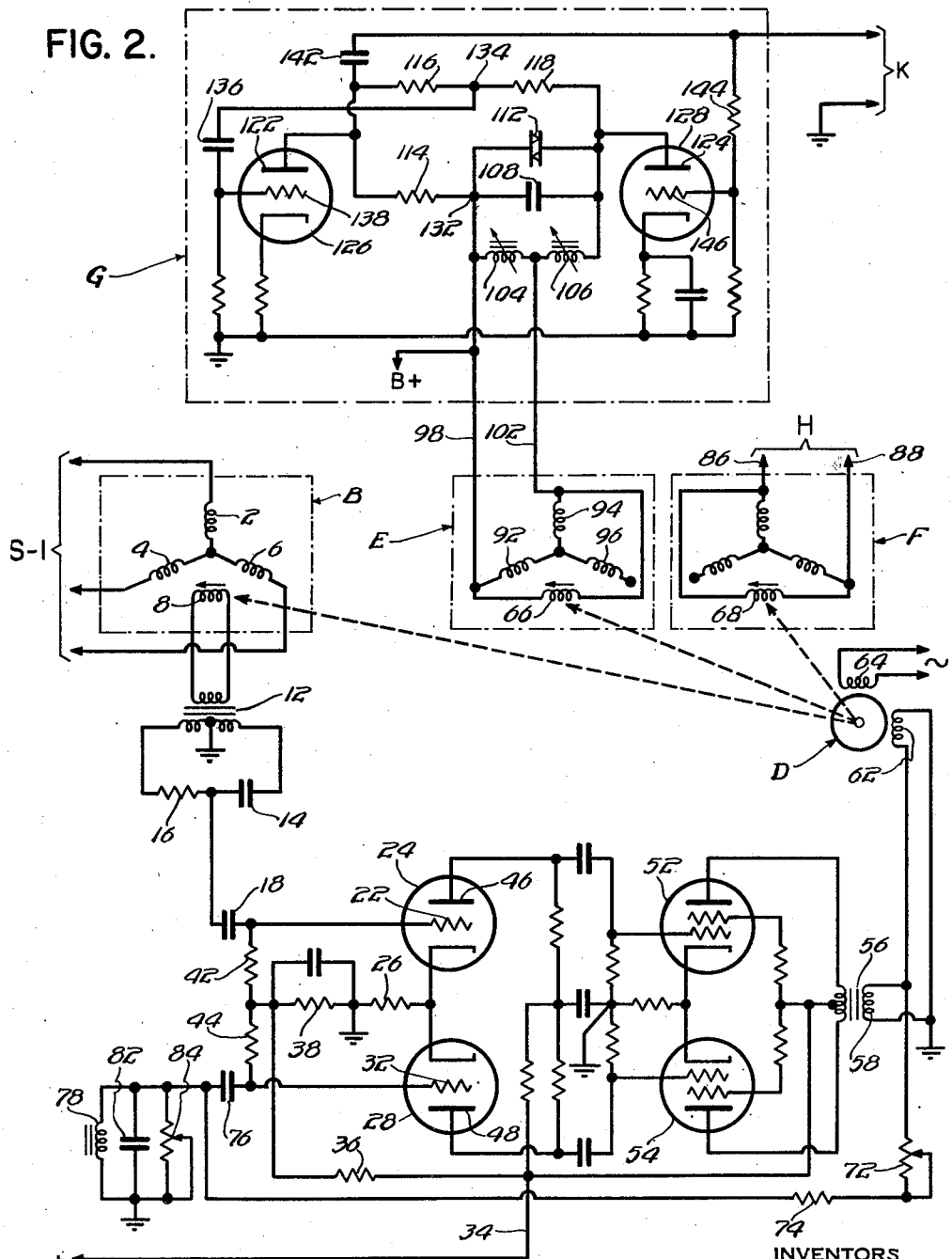
Fig. 2 shows schematically apparatus for producing an audio modulation frequency in accordance with applied Selsyn voltages.
Figure 3:
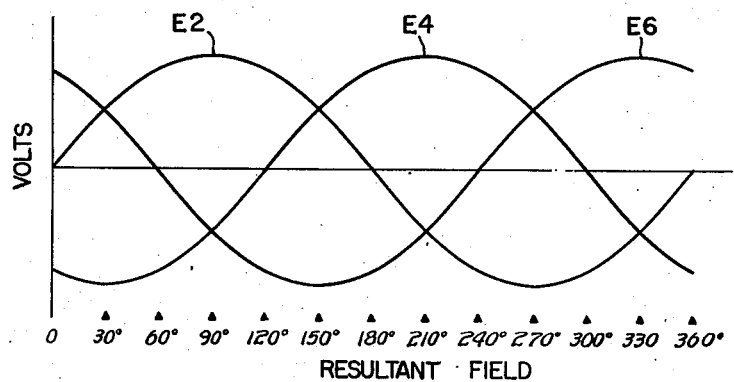
Fig. 3 shows the voltages of the Selsyn system as a function of the direction of the resultant field.

The three voltages from a suitable source A, for example, a Selsyn system, which denote the angular information to be remotely indicated, are applied, respectively, to stator windings 2, 4, and 6 of a synchro motor B. (Fig. 2.) These three windings are arranged physically 120 degrees apart to produce a resultant magnetic field the direction of which is a function of the relative magnitudes of the three voltages. The effective values of these voltages and the direction of the resultant field produced thereby are shown in Figure 3. The curves E2, E4, and E6 represent the effective values of the alternating voltages, 60 cycles in this example, between the terminals of respective windings of the synchro motor B. These voltages, upon which the direction of the resultant field depends, are in phase as regards time, except that crossing of the zero line in Fig. 3 indicates a reversal of phase, and thus differ only in relative magnitudes and directions of current flow. A voltage is induced in rotor winding 8 of synchro motor B dependent upon the voltages applied to the stator windings 2, 4, and 6, and upon the angular position of rotor 8 with respect to the angular direction of the resultant field.

The output of rotor winding 8 is connected, through a 4 to 1 step-up transformer 12, to a phase shift circuit comprising a condenser 14 and a resistor 16. This circuit shifts, by 90 degrees, the phase of the 60 cycle voltage from the Selsyn system so that after suitable amplification it may be used for operating the two-phase induction type reversible motor D.

The voltage appearing across condenser 14 of the phase shift circuit is applied through a condenser 18 to a grid 22 of a triode vacuum tube 24. This tube is cathode coupled through a cathode resistance 26 to a similar tube 28 to form a phase-inverter amplifier circuit. Because of the high value of cathode resistance 26 required in this circuit, it is necessary to apply positive voltage to the grid 22 of tube 24 and grid 32 of tube 28. This voltage is provided from a suitable power supply (not shown) through a positive voltage supply lead 34 by means of a voltage divider circuit comprising resistors 36 and 38; the grids being connected to a point between these two resistances by grid return resistors 42 and 44. The anodes 46 and 48 of tubes 24 and 28, respectively, are coupled by conventional resistance-capacitance networks to a push-pull output circuit including vacuum tubes 52 and 54 and an output transformer 56.

The secondary winding 58 of output transformer 56 is coupled to field winding 62 of the motor D. The other winding 64 of this two-phase motor is connected to a source of alternating voltage that is in phase with the Selsyn voltages which are applied to the stator windings of synchro motor B. The voltage applied to winding 62, thus, leads or lags, by 90 degrees, the voltage applied to winding 64, because of the phase shift produced by condenser 14. Thus, the rotation of the armature of motor D depends upon the magnitude of the current induced in rotor winding 8 of synchro motor B; the direction of rotation depending upon whether the voltage induced in winding 8 is in phase, or 180 degrees out of phase, with the Selsyn supply voltage. The armature of motor D is connected mechanically to control the angular position of rotor winding 8 of synchro motor B and rotor windings 66 and 68 of synchro units E and F, respectively. The windings of motor B are connected so that the voltage induced in the rotor winding 8 causes motor D to adjust the rotor winding 8 in such direction as to reduce the voltage induced therein. Thus, when voltages are applied to the stator windings 2, 4, and 6 of synchro motor B, motor D rotates the rotor of motor B until zero voltage is induced in winding 8.

However, because of the inertia of the mechanical system and because zero voltage is induced in winding 8 at the condition of balance, there is a tendency to overrun the zero position until sufficient torque is developed in the opposite direction to stop and reverse motor D. This would cause oscillation or "hunting" in the system. In accordance with the present invention, such hunting is prevented by a tuned feedback circuit connected between the ungrounded side of secondary winding 58 of transformer 56 and the grid 32 of vacuum tube 28. This winding is connected through an adjustable resistor 72, a fixed resistance 74, and a condenser 76 to the grid 32. Also connected between the grid 32 and ground is a parallel circuit, including an inductance 78 and a capacitance 82, which is resonant at the applied frequency. An adjustable resistance 84, connected in parallel with this resonant circuit, provides an adjustable damping effect on the resonant circuit by effectively varying the Q of that circuit as the value of the resistance 84 is changed.

When motor D moves the rotor winding 8 of synchro motor B to the position of zero voltage, there is no input to the amplifier from that source. There is, however, a negative feedback voltage applied to the input of the amplifier through condenser 76, because the voltage which is developed across the tuned circuit is maintained for several cycles before the stored energy is dissipated, producing a relatively large signal in the opposite direction from that which was delivered by the winding 8, and applying a backward torque to motor D thereby damping the hunting action. By adjusting resistance 72 to vary the feed-back ratio, and resistance 84 to vary the Q of the resonant circuit, the damping may be made just sufficient to prevent oscillation and provide a stable system for positioning the rotor of synchro motor B and synchro units E and F without loading the Selsyn or other circuit which supplies the signal voltage S—1.

Oscillators G and H

Thus, the rotors of synchro units E and F are adjusted to an angular position in accordance with the data supplied by the Selsyn signal S—1. These synchro units are incorporated in the plate circuits of oscillators G and H, respectively, and in accordance with the angular positions of the rotor windings 66 and 68 control the frequencies of oscillation of the respective oscillators.

Oscillator G, which, for the purposes of this example, is assumed to operate over the frequency range from 1475 to 2950 cycles per second, is shown in detail in Fig. 2. Oscillator H (details not shown) is identical with oscillator G, except that it is designed to operate over the frequency range between 600 and 1200 cycles per second, and is connected in a similar manner to the terminals 86, 88 of synchro unit F.

Synchro unit E has the usual stator windings 92, 94, and 96 disposed physically 120 degrees apart, around the rotor winding 66. Stator windings 92 and 94 are connected in series and this series combination is connected in parallel with rotor winding 66. The total inductance appearing between output leads 98 and 102 is thus a function of the position of rotor winding 66 relative to the stator windings 92 and 94.

In this particular application it is desirable for the value of this inductance, which is effective in the oscillator G, to vary in such a manner that the oscillator frequency is a sine function of the angular position of rotor 66. To accomplish this, an inductance 104 is placed in parallel with the output leads 98 and 102 and a second inductance 106 is placed in series with the output circuit thereof. The inductances 104 and 106 are provided with low-loss powdered iron cores which may be adjusted in position relative to the turns of the coils, to change the inductance of the respective coils. By proper adjustment of the inductances of these two coils the total inductance follows closely a sine function of the angle of rotation of rotor winding 66.

A condenser 108 is connected in parallel with the inductive circuit just described to form a parallel circuit, the resonant frequency of which may be varied by rotating the rotor winding 66 of the synchro unit E. This parallel circuit forms the resonant circuit of a bridge-type oscillator.

A varistor, or negative coefficient resistance element, 112 is connected in parallel with the resonant circuit. This varistor is for the purpose of stabilizing the amplitude of the oscillator circuit, as will be described later.

The parallel resonant circuit, together with the varistor 112, forms one arm of a bridge circuit. This arm balances against a resistance 114; the third and fourth arms of the bridge circuit being formed by resistances 116 and 118. The supply voltage for the bridge is provided by anodes 122 and 124 of triode vacuum tubes 126 and 128, respectively. The resistance 118 is slightly less in value than the resistance 116, so that a slight unbalance condition exists and a corresponding voltage exists between points 132 and 134 of the bridge circuit. This unbalance voltage is applied through a condenser 136 to grid 138 of vacuum tube 126. The anode 122 of this tube supplies operating potential to one side of the bridge circuit and is coupled also through a condenser 142 and a resistance 144 to grid 146 of vacuum tube 128. The anode 124 of this tube is connected to the opposite side of the bridge circuit so that the voltage provided for operation of the bridge circuit is the difference in potential existing between anodes 122 and 124. Thus, the unbalance voltage of the bridge is fed back through two stages of amplification and applied as the operating bridge voltage. The frequency of oscillation depends upon the parallel resonant circuit described above and may be varied through approximately one octave by rotating the rotor winding 66 of synchro unit E through 360 degrees.

The varistor 112 is chosen so that at the desired amplitude of oscillation its resistance, which is a function of the voltage existing across the varistor, is approximately equal to the impedance of the parallel resonant circuit. The total impedance of this arm of the bridge therefore, is a function of the resistance of the varistor which is in turn a function of the voltage existing across it.

As the amplitude of oscillation increases, the resistance of the varistor decreases, which, because of the values of resistance chosen for resistors 114, and 116 and 118 reduces the unbalance of the bridge and, therefore, reduces the unbalance voltage which is applied to the grid of vacuum tube 126 and which in turn decreases the voltage supplied to the bridge by the anodes of vacuum tubes 126 and 128. If the amplitude of oscillation decreases, the resistance of varistor 112 increases, which creates a greater unbalance in the bridge and, thus, applies a higher voltage to the grid 138 of vacuum tube 126, and so a higher voltage to the bridge circuit thus providing automatic compression.

Figure 4:
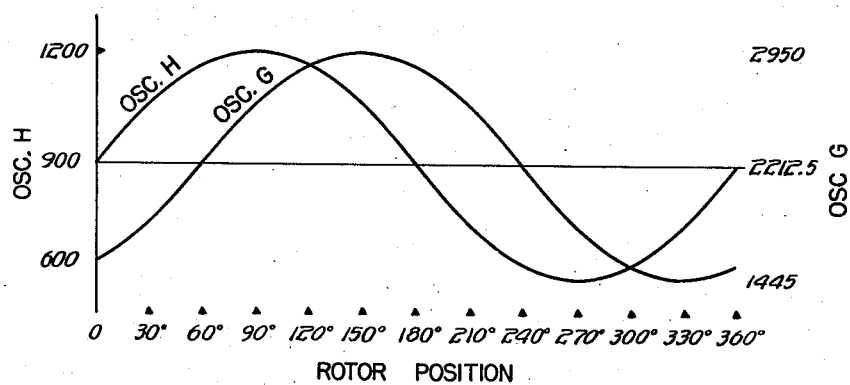
Fig. 4 shows the corresponding modulation frequencies as a function of the field direction.

The amplitude stability of this oscillator has been found very good, even though the Q of the synchro unit E is generally low. One particular oscillator, in which the Q of the synchro unit was between three and five, produced an average amplitude of ten volts and maintained this amplitude within plus or minus three percent, as the frequency was varied through one octave by rotating the rotor winding 66 of the synchro unit E. At this ten volts output level, all harmonics were down at least 30 decibels. Fig. 4 shows the curve of frequency variation of oscillator G and oscillator H in accordance with the angular position of rotor windings 66, and 68, respectively, which correspond to the angular information provided by the Selsyn voltages. The output circuits of oscillators G and H are connected to the input of the mixer-amplifier K.

*Oscillator J*

Figure 5:
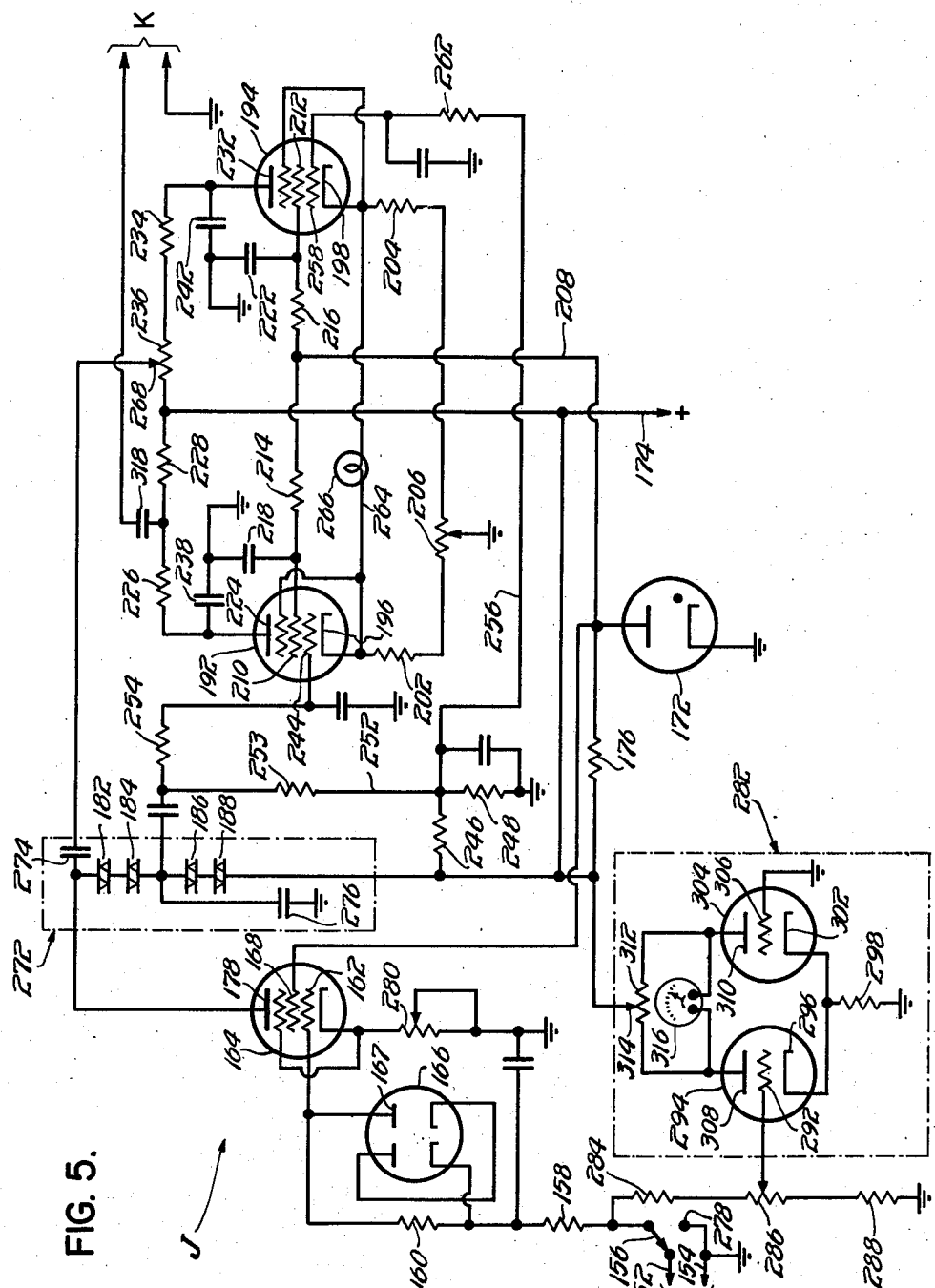
Fig. 5 is a circuit diagram of apparatus for producing a modulation frequency in accordance with an applied direct voltage.

The magnitude data which are to be transmitted are applied by a direct current signal S—2, the magnitude of which is a function of the data, to the terminals 152 and 154 (Fig. 5) of the variable frequency oscillator J. Terminal 152 is connected through a switch arm 156, and resistances 158 and 160 to a control grid 162 of a pentode vacuum tube 164.

The current through the tube 164, as will be explained below, controls the frequency of the oscillator J and, therefore, must not be subject to variations caused by factors other than the applied signal S—2. A dual diode 166, the two sections of which are connected in series and are in turn connected in parallel with the resistance 160, serves the dual function of providing negative bias for the tube 164 and compensating for changes in the filament voltage applied to tube 164. This compensation takes place in the following manner: when the filament or cathode of an ordinary vacuum diode is heated, there is electron emission from cathode to plate even though no positive voltage is applied to the plate. This action produces a negative voltage on the plate of the tube, relative to the cathode. In the present application the voltage produced, by this effect, on anode 167 of tube 166 provides bias voltage for the tube 164. The filaments or heaters of tube 166 and tube 164 are connected to a common source so that a change in the voltage applied to the heater circuit of tube 164 simultaneously affects tube 166. Assume an increase in these heater voltages which will tend to increase the plate current through tube 164. This increased heater voltage will increase also the electron emission of the cathodes of tube 166 thus placing an increased negative voltage on anode 167 of this tube and increasing thereby the negative voltage on the grid 162 of tube 164; thus providing automatic compensation for the increase in heater voltage. If the heater voltage decreases, compensation takes place by reducing the negative bias on tube 164.

As a further measure to maintain constant plate current through tube 164, the voltage of screen 168 is regulated by a gaseous discharge type voltage regulator tube 172, which is connected to the positive voltage supply lead 174 through a dropping resistor 176. The screen 168 is, of course, more influential in holding the plate current constant in this type tube than is the voltage of anode 178 and the plate current remains substantially constant, even with considerable variation in the plate voltage of the tube.

Voltage is supplied to the anode 178 through four varistors, 182, 184, 186, and 188, which are connected in series between the anode 178 and the plate supply lead 175. These varistors, the resistance of which is a function of the current through tube 164, are connected also in a phase-shift feed-back circuit of a two stage oscillator to control the frequency of oscillation.

Two pentode tubes 192 and 194 are connected as a cathode-coupled oscillator. Cathodes 196 and 198 of these tubes are connected to ground through resistances 202 and 204, respectively, and through variable resistance 206, common to both circuits, for balancing the plate current through the tubes. Voltage for screens 210 and 212 of these tubes is provided through lead 208 from the same regulated power supply that provided the screen voltage for tube 164. Resistors 214 and 216 are connected in series with screen grids 210 and 212, respectively, and together with by-pass condensers 218 and 222, are provided to suppress parasitic oscillation. Anode 224 of tube 192 is connected through series resistors 226 and 228 to the positive voltage supply lead 174. Anode 232 of tube 194 is connected through series resistors 234 and 236 to supply lead 174. Resistors 226 and 234 are connected directly at the tube socket terminals, as are by-pass condensers 238 and 242, for suppressing parasitic oscillations in the plate circuits.

Control grid 244 of tube 192 is biased positively with respect to ground by a voltage divider circuit comprising resistances 246 and 248 which are connected between the supply lead 174 and ground. A lead 252 is connected through a series resistor 253 to a point between the two resistances and to grid 244 through a suppressor resistance 254. Lead 256 is connected to the same point between resistors 246 and 248 and supplies bias voltage to control grid 258 of tube 194 through suppressor resistance 262.

Tube 192 is coupled to tube 194 by a lead 264 which is connected between cathode 196 and cathode 198. A lamp 266 is connected in series with this lead for the purpose of stabilizing the amplitude of oscillation. Lamp 266 has a positive temperature coefficient and, as the amplitude of oscillation increases, the current through lead 264 rises thus increasing the resistance of lamp 266 which decreases the cathode coupling and, thus, the amplitude of oscillation. Adjustment of the tapped resistance 206 provides direct current balance and eliminates the flow of direct current through the lamp 266. The amplitude of oscillation may be adjusted to a desired value by varying the amount of feedback through adjustment of tap 268 on resistance 236.

Energy is fed back from the anode circuit of tube 194 through the adjustable tap 268 of resistance 236 to a phase-shift network, enclosed within the broken line 272, which applies the feedback signal to the control grid 244 of tube 192. The phase of the voltage delivered by the anode circuit of tube 194 is such that maximum amplitude of oscillation will occur if there is no phase shift in the circuit 272. This phase-shift circuit 272, which includes a condenser 274, the four varistors 182, 184, 186, and 188, and a condenser 276, is frequency sensitive and there is only one frequency at which zero phase shift takes place. The amount by which the phase is shifted in this circuit varies rapidly on either side of this critical frequency; the oscillator, therefore, generates that frequency for which there is zero phase shift. This frequency is given by the expression:

$$f = \frac{1}{2\pi\sqrt{(R_{182} + R_{184})(R_{186} + R_{188})C_{274}C_{276}}}$$

where $R_{182}$, $R_{184}$, $R_{186}$, and $R_{188}$ are the resistance values of the correspondingly numbered varistors, and $C_{274}$ and $C_{276}$ are the capacities of condensers 274 and 276, respectively.

If the sum of $R_{182}$ and $R_{184}$, denoted by R, is made equal to the sum of $R_{186}$ and $R_{188}$, and $C_{274}$ is made equal to $C_{276}$ and denoted by C, then the frequency of the oscillator is given by the expression:

$$f = \frac{1}{2\pi RC}$$

The frequency may be varied accordingly by simultaneously changing the capacity of the two condensers or by changing the resistance of the varistors. In this circuit the resistance is the value that is changed. Because the resistance of the varistors changes with change in current through them the frequency of oscillation may be controlled or varied, accordingly, by changing the plate current through tube 164 and consequently the direct current through the varistors. This current is controlled by the signal S—2 which is applied to the control grid 162 of tube 164. The frequency at which the oscillator operates when there is no input voltage, i. e. when switch arm 156 is connected to terminal 278, is adjusted by varying a rheostat 280 in the cathode circuit of tube 164. This oscillator, for the purposes of this example, is assumed to operate over the frequency range from 200 to 400 cycles per second.

In order to indicate the frequency at which the oscillator is operating, a bridge circuit, generally indicated at 282, is utilized to measure the direct voltage applied to the oscillator control tube 164. A voltage divider, consisting of resistances 284, 286, and 288, is connected between switch arm 156 and ground. A tap on resistor 286 is connected to control grid 292 of a triode vacuum tube 294, which is coupled through its cathode 296 to cathode 302 of a similar tube 304 by means of a common cathode resistance 298. Control grid 306 of tube 304 is connected to ground. Anodes 308 and 310 of tubes 294 and 304, respectively, are connected together through a balancing potentiometer 312 the adjustable tap of which is connected to the supply lead 174. The bridge is initially balanced, with zero voltage applied to grid 292, by adjusting the variable tap 314. Voltage applied to grid 292 unbalances the circuit by an amount indicated on a voltmeter 316 connected between the two anodes. This meter may be calibrated conveniently in frequency and so indicate directly the frequency of oscillation.

The output circuit of oscillator J is coupled from the anode circuit of tube 192 through a condenser 318 and is connected to the input of the mixer-amplifier K (Fig. 1) where it is combined with the signals from oscillators G and H.

Mixer amplifier K

Figure 6:
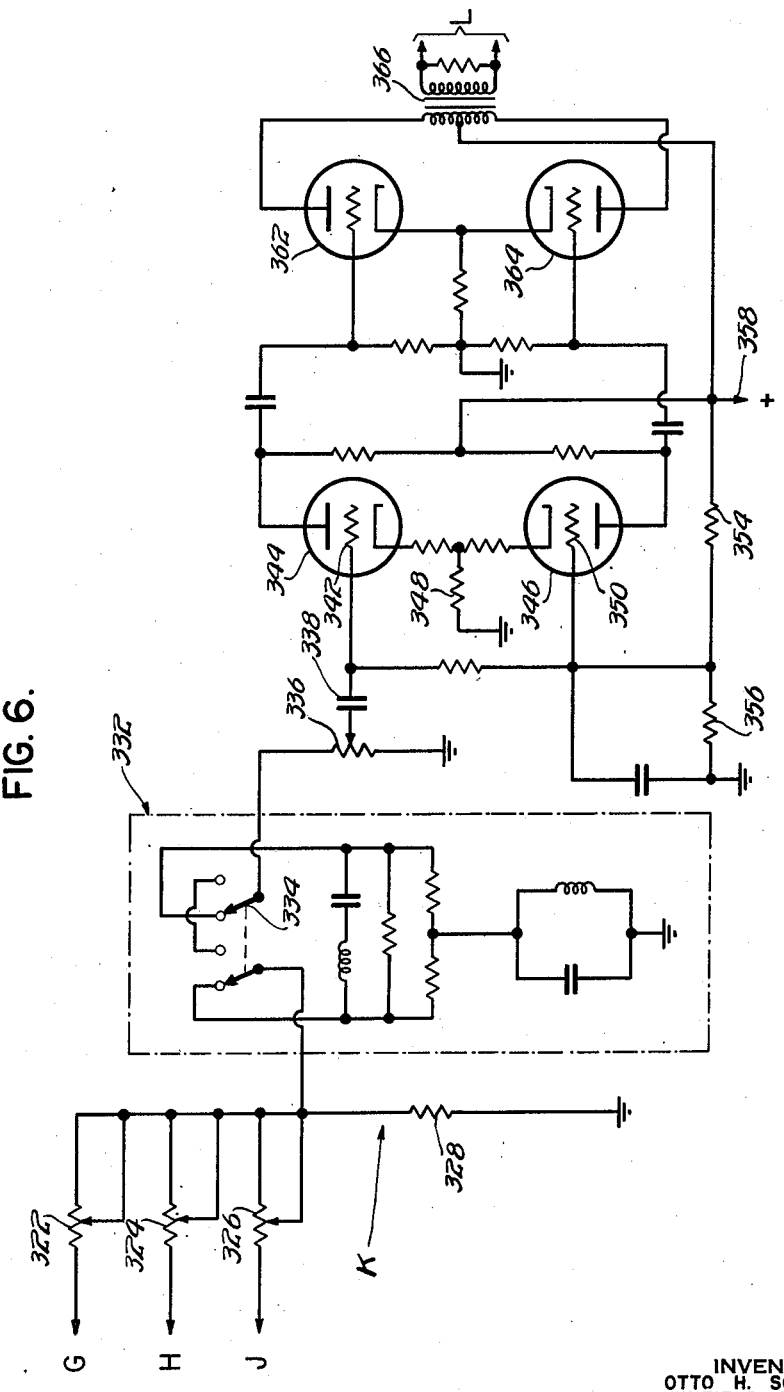
Fig. 6 is a schematic diagram of a mixer-amplifier for combining the modulation voltages.

The output signals of the oscillators G and H and the output from oscillator J are combined in a resistance network (Fig. 6) comprising three variable resistances 322, 324, and 326, and a fixed resistance 328. The individual potentiometers are provided to permit approximately six decibels of independent adjustment of the output of each oscillator. In applications where the characteristics of the radio transmitter and receiver are such that they discriminate against low or higher ranges of frequency, an equalizer pad may be provided for compensation. This equalizer pad, indicated within the broken line 332, for use where the radio transmitter and receiver discriminate against the low audio frequencies, produces an insertion loss of four decibels at 200 cycles, fourteen decibels at 400 cycles, and sixteen decibels above 1000 cycles. The equalizer pad may be switched into or out of the circuit by means of a switch 334. The output circuit of the equalizer pad 332 is connected through a potentiometer 336 and a coupling condenser 338 to a grid 342 of triode tube 344. Tube 344 operates in conjunction with a phase-inverter triode tube 346, to which it is coupled through a cathode resistor, 348. Grid 342 of tube 344 and grid 350 of tube 346 are biased positively with respect to ground by a voltage divider comprising resistances 354 and 356 connected between a high voltage supply lead 358 and ground. The anode circuits of tubes 344 and 346 are resistance-capacitance coupled to push-pull output tubes 362 and 364 in conventional manner; this output stage being coupled through transformer 366 to the transmitter L, where the signals are used to amplitude modulate the transmitter carrier in the usual manner.

RECEIVING EQUIPMENT

Filters O, P and Q

The transmitted signal is received by receiver N, which may be a conventional communication receiver of either tuned radio frequency or superheterodyne type. After detection, the modulation components, which may be further amplified, if necessary, by a circuit arrangement similar to amplifier K in the transmitting equipment, are separated by three filters O, P and Q. The high-pass filter O, in this particular application, has a cut-off frequency of 1450 cycles and the band-pass filter P has a pass-band of 585 to 1225 cycles per second. These two filters provide the information necessary to reconstruct the Selsyn signals, and thus, provide the angular information. The third filter Q is a low-pass filter with a cutoff frequency of 410 cycles per second and provides a signal the frequency of which is a function of the magnitude of the original signal S—2. Each of these filters has an attenuation of less than four decibels within its pass-band and an attenuation of at least 30 decibels in each of the other bands. In this particular case the filters may be designed conveniently with input and output impedances of 600 ohms.

Discriminators R, T, and U

Figure 7:
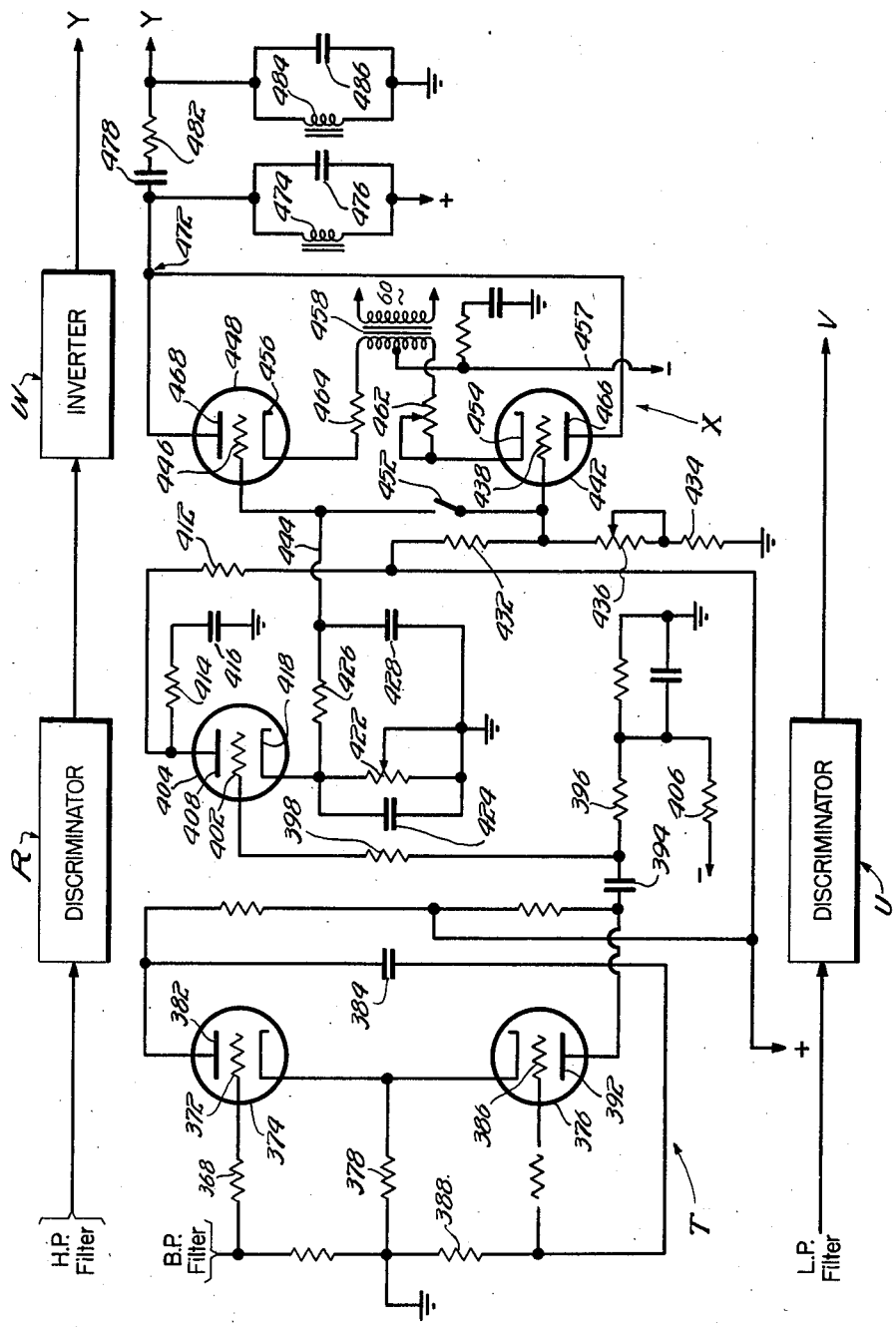
Fig. 7 is a partial schematic diagram of the discriminators and inverters utilized in the receiving equipment for reconverting the modulation signals into alternating Selsyn voltages.

The circuit diagram of discriminator T, which is connected to the output of band-pass filter R is shown in Figure 7; discriminators R and U are substantially the same and are shown only in block form.

The audio-frequency signal from band-pass filter P, which lies in the range between 600 and 1200 cycles, is utilized to control the repetition frequency of a square wave generator. These square waves subsequently are differentiated and the positive peaks utilized to trigger a counter circuit which develops a direct voltage proportional to the repetition rate of the differentiated pulses.

The audio signals from filter P are applied through a resistor 368 to grid 372 of a triode tube 374 which, in combination with a similar tube 376, forms a multi-vibrator circuit. The tubes in this multi-vibrator circuit are cathode coupled through a resistance 378; anode 382 of tube 374 is coupled through a condenser 384 to grid 386 of tube 376. This circuit generates a square wave the repetition frequency of which is controlled by the frequency of the input signal from band-pass filter P. The frequency of oscillation when no input signal is applied is a function of the time constant of condenser 384 and resistance 388 which are adjusted, in this example, so that the natural frequency of oscillation is approximately 800 cycles, i. e. near the mid-frequency of the range over which the multi-vibrator must operate. When audio signals having greater than approximately one-tenth volt R. M. S. are applied to the input, the multi-vibrator synchronizes with the input signal and oscillates at that frequency.

The output voltage from the multi-vibrator is taken from anode 392 of tube 376 and is differentiated by a condenser 394 and a resistance 396. This differentiation produces a relatively sharp positive peak when the voltage of the square wave rises rapidly in a positive direction, and a second impulse, which is negative, when the voltage of the square wave changes suddenly in a negative-going direction. These differentiated signals are coupled through resistance 398 to a control grid 402 of a grid-controlled gaseous discharge tube 404. A negative bias voltage is applied to grid 402 from a power supply (not shown) through a resistance 406. Anode 408 of the gaseous discharge tube is coupled to a high voltage supply (not shown) through a series resistance 412, and is connected also through a resistance 414 to a condenser 416, the opposite terminal of which is connected to the ground. Cathode 418 of the gaseous tube is connected to ground through a variable resistance 422 which is in parallel with a capacitance 424. The output signal from the gaseous discharge tube is taken from the cathode through an R. C. filter including resistance 426 and capacitor 428.

Tube 404 operates as a saw-tooth generator in which the capacitor 424 and resistor 422 form a storage circuit across which a voltage is developed that is proportional to the repetition rate of the saw-tooth generator, which is triggered by the positive pulses produced by differentiating the square waves from the multi-vibrator, thus producing one saw tooth for each positive pulse; the negative pulses having no effect on the circuit. Each positive pulse, applied to grid 402, causes ignition of tube 404 which immediately transfers a fixed portion of the charge which is on condenser 416 to the condenser 424 in the cathode circuit. When the charge has been transferred through the tube in this manner, the voltage on anode 408 of the tube drops to a low value, because of the voltage drop across resistance 412, and the tube is extinguished. Condenser 416 then recharges through resistance 412 and resistance 414 to a voltage equal to the supply voltage. The tube 404 is prevented from igniting at this time by the negative bias voltage which is applied to grid 402 through resistances 406, 396, and 398. The subsequent narrow positive pulse, however, ignites the tube and causes the transfer of another identical charge to condenser 424 from condenser 416. The voltage across the condenser 424 is, therefore, a function of the frequency of the saw-tooth generator, that is, this voltage is proportional to the charge transferred per unit time; the same amount of charge being transferred for each cycle of the incoming signal and the discharge time constant of the cathode circuit remaining constant. Resistor 426 and capacitor 428 form an R. C. filter for smoothing the output voltage. In this particular example, the values of the components are so chosen that a D. C. output voltage of approximately 10 volts is developed at the mid-frequency of the frequency range with resistance 422 adjusted to its maximum value.

Inverters W and X

The direct voltage from the discriminator controls the operation of an inverter circuit which develops a 60 cycle alternating voltage the magnitude and phase of which are dependent upon the magnitude and polarity, respectively, of this applied direct voltage.

With relation to the Selsyn signals the mid-frequency of the channel represents a reversal in phase and it is desirable, therefore, that the D. C. output reverse polarity at this point in order that the Selsyn signals may be properly reconstructed. This is accomplished by means of a bleeder network (Fig. 7) comprising fixed resistors 432, and 434, and a variable resistance 436 connected in series between the high voltage supply lead and the ground. A tap taken between resistances 432 and 436 provides a positive bias voltage on grid 438 of tube 442 of the inverter X. In this particular example, a positive voltage of approximately 10 volts is applied to grid 438. The voltage delivered from the cathode circuit of tube 404 is connected through lead 444 to grid 446 of tube 448 of the inverter.

If the voltage applied to grid 438 is so adjusted that at the mid-frequency it is equal to the voltage applied to grid 446 i. e. the voltage across condenser 424, then the difference in voltage between the two grids will be zero at the mid-frequency and will reverse polarity at this point. A switch 452 is provided for connecting these two grids directly together for purposes of adjustment or test.

A negative supply voltage, say 150 volts, is applied to cathodes 454 and 456 of tubes 442 and 448, respectively, through a lead 457, the secondary winding of a transformer 458 and series resistances 462 and 464. The transformer 458 superimposes 60 cycle alternating voltages which are 180 degrees out of phase, on the two cathodes 454 and 456. This 60 cycle alternating voltage has an amplitude, in this example, of approximately 0.65 volt R. M. S. Anodes 466 and 468 of these tubes are connected together in the output circuit.

The phase and amplitude of the output current thus depend upon the relation between the transconductances of the two triode tubes 442 and 448. For example, if grid 446 of tube 448 is biased so that this tube draws no current and grid 438 of tube 442 is biased so as to permit the flow of plate current, the output current at point 472 will have a given phase. If the biases on the two grids are reversed so that tube 448 draws plate current and tube 442 is cut off, the phase of the voltage appearing at point 472 will be reversed. Thus, the phase of the output current and the amplitude are controlled by the relationship between the bias voltages applied to the two grids. If the plate currents through the two tubes are equal, no signal voltage appears at point 472 because the two voltages, 180 degrees out of phase, cancel. Initial balance is obtained by closing switch 452 and adjusting the value of resistance 462 until balanced conditions are obtained. This adjustment having been made, the phase of the output current will then reverse at the point where the potential difference applied to the two grids changes polarity.

If the characteristic curves of the two tubes are not identical, considerable second harmonic signal may be produced by the inverter near the null point, i. e. the point of phase reversal, as a result of the imperfect cancellation caused by small differences in the plate-current grid-bias characteristics of the tubes. It is desirable to suppress this second harmonic output in order to utilize the maximum range of linearity between the direct input voltage and the 60 cycle output signal. This is accomplished by using a plate load tuned to parallel resonance at 60 cycles followed by a tuned voltage divider.

The tuned parallel circuit includes an inductance 474 and a capacitance 476, the values of which are chosen so as to produce a high-Q circuit resonant at 60 cycles. The output from this circuit is connected through a capacitor 478 to a voltage divider circuit which comprises a resistance 482 and a parallel resonant circuit having a high-Q and including an inductance 484 and a capacitor 486 and which is resonant at 60 cycles. The output voltage is tapped off between the resistance 482 and this parallel resonant circuit.

The resulting amplitude characteristic of this inverter is linear over a range greater than 100 to 1 and produces 0.5 volt R. M. S. output with a three volt signal applied to the input.

The discriminator R and the inverter W which are connected to the output of the high pass filter O are identical with the discriminator and inverter just described and are illustrated in block diagram form only.

The output of the low-pass filter Q is applied to discriminator U which may be substantially identical with discriminator T described above; however, the output of this discriminator may be applied directly to a suitable indicator, as for example, recording pen V.

*Amplifier Y*

Figure 8:
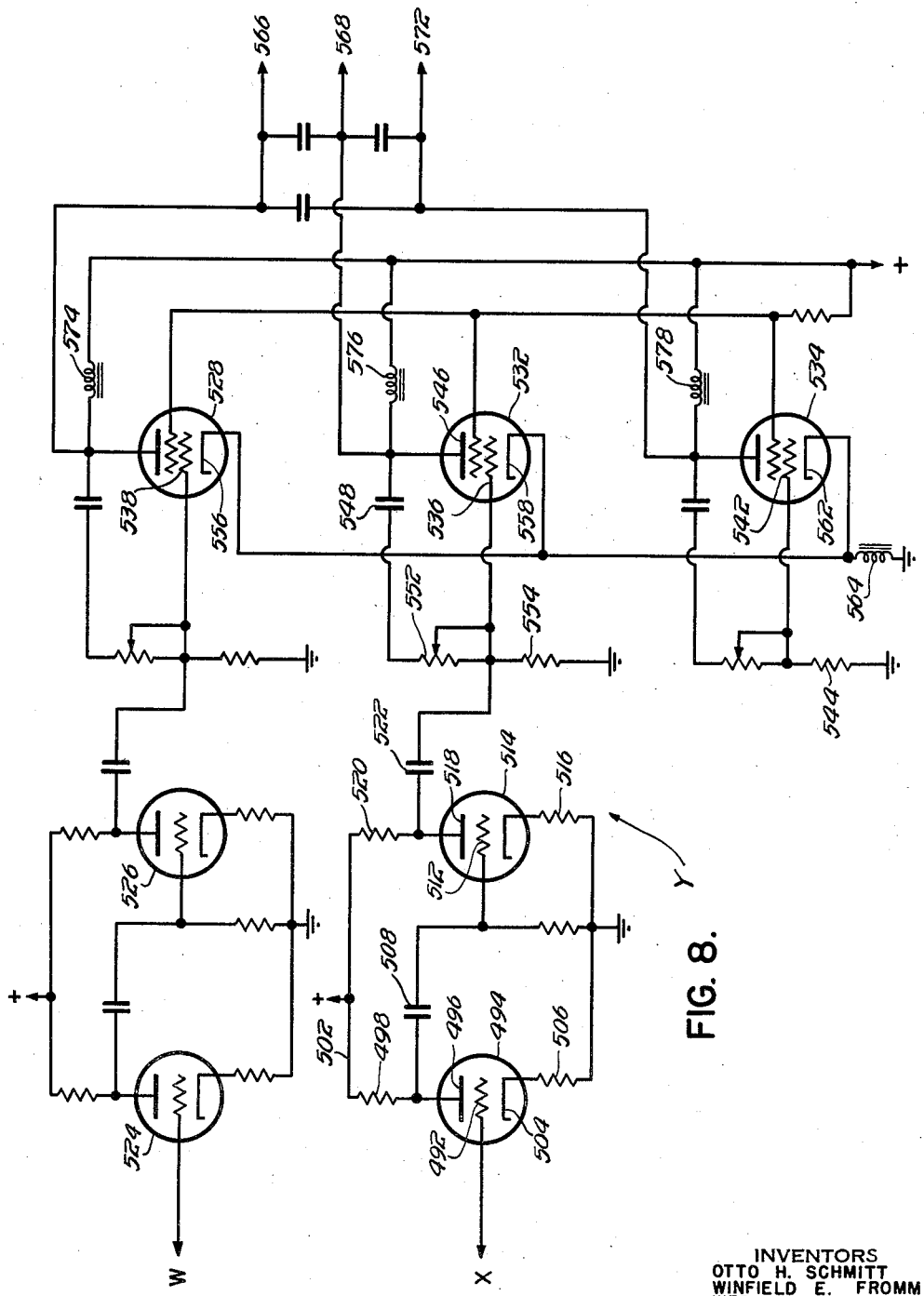
Fig. 8 shows the amplifier for these voltages and apparatus for reconstructing the third Selsyn voltage.

The 60 cycle signals delivered by inverters W and X carry the angular information provided by the original signal S—1. These signals are applied to amplifier Y (Fig. 8) which amplifies these 60 cycle signals and reconstructs the third Selsyn voltage which was not transmitted.

The signal delivered by inverter X is applied to grid 492 of triode 494. Anode 496 of this tube is connected through a plate load resistance 498 to high voltage supply lead 502. Cathode 504 of this tube is coupled to ground through a cathode bias resistance 506, which is un-bypassed to provide degenerative feedback. The anode 496 is coupled through a coupling condenser 508 to grid 512 of triode tube 514, the cathode resistance 516 of which is also un-bypassed providing additional negative feedback. The anode 518 of this tube is coupled also to the high voltage lead 502 through a plate load resistance 520 and to the output circuit through a coupling condenser 522.

The signals from inverter W are amplified by tubes 524 and 526 in a similar circuit arrangement. Small differences in gain in the inverters and these two stage amplifiers are compensated by adjusting the output of the discriminators, so that equal input signals to the two discriminators produce equal alternating output signals from these amplifiers.

An output circuit having three tubes 528, 532, and 534 is provided to combine the signals delivered by tubes 514 and 526 and to reconstruct the third Selsyn voltage. The signal from inverter X, after amplification by tubes 494 and 514, is coupled by condenser 522 to a control grid 536 of tube 532. The alternating output of inverter W, after amplification by tubes 524 and tube 526, is coupled to grid 538 of tube 528. Control grid 542 of the third tube 534 is connected to ground through a resistance 544. Cathodes 556, 558, 562, of these tubes are connected together and to ground through an inductance 564.

A feed-back circuit is provided for each of these tubes from the plate to the grid, as for example in connection with tube 532, anode 546 is coupled through capacitor 548 and a variable resistor 552 to the control grid 536. These negative feedback circuits minimize changes in amplification caused by ageing or replacement of the tubes.

With this arrangement the three Selsyn voltages originally present in signal S—1 are applied to the output terminals 566, 568, and 572. One of these voltages is proportional to the input signal voltage delivered by tube 514, a second voltage is proportional to the input signal voltage delivered by tube 526, and a third (developed in the final amplifier stage) is proportional to the voltage difference between these input signals. This latter signal voltage is produced most readily by adjusting the circuits so that equal signal gain is provided by each of the three tubes. This condition will obtain provided the tubes 528, 532, and 534 are substantially identical and the plate load impedances, 574, 576, and 578 have equal impedance values. The effective driving voltage of each of these tubes, i. e. the grid-to-cathode signal voltage, will be the difference between the voltage appearing between the respective grid and ground and that developed across the common cathode impedance 564. In the case of tube 534, where no signal is applied directly to the grid, this will be the voltage appearing across the common cathode inductance 564, which produces an opposite effect on the plate current of tube 534 to that produced on the plate currents of tubes 528 and 532 by the signals applied to their respective grids.

The output voltages developed across the load impedances 574, 576, and 578 are proportional to the grid-to-cathode voltages of the respective tubes and are 180 degrees out of phase with respect thereto; the voltage across load impedance 578 being out of phase with the voltages across impedances 574 and 576.

The output voltage between leads 566 and 572 is equal to the algebraic sum of the voltages across plate impedance 574 and plate impedance 578, noting that these two plate impedances are connected so that the voltages produced therein by the voltage across the cathode impedance 564 cancel. This voltage is proportional, therefore, to the magnitude of the signal applied to grid 538 of tube 528. In the same manner the voltage appearing between leads 568 and 572 is proportional to the voltage applied to grid 536 of tube 532.

The voltage between leads 566 and 568 is proportional to the algebraic sum of the voltages appearing across plate load inductances 574 and 576. These inductances are connected in opposition so that the output signals produced by the voltage across cathode impedance 564 cancel and the net voltage between leads 566 and 568 is proportional to the difference in voltage between the signals applied to grids 536 and 538 by amplifier tubes 514 and 526, respectively.

These signals, which have the desired relationships, are applied to the three stator windings of a synchro unit Z, which operates the turntable; the synchro rotor being connected to the same source of 60 cycle voltage that provided the alternating component in the cathode circuits of inverters W and X. Thus, the angular position of synchro motor Z and its turntable will be adjusted automatically in accordance with the position of the armature of motor D in the transmission circuit which is, of course, a function of the Selsyn signal S—1. The radial distance between the recording pen V and the center of the turntable will be in accordance with the magnitude of signal S—2. Thus, it is seen that an entirely practical system is provided for the transmission of angular and magnitude data and that this system may be constructed readily with ordinary components and construction techniques, and does not require especially stabilized transmitting and receiving apparatus, but may employ ordinary commercial type communication equipment.

We claim:

1. A method of telemetering angular information comprising the steps of generating a first signal the frequency of which is a sine function of the instantaneous angular displacement between a variable direction and a first reference direction, generating a second signal the frequency of which is of a sine function of the angle of displacement between said variable direction and a second reference direction displaced 60 degrees from said first reference direction, simultaneously transmitting said signals from a first to a second location, deriving from said signals a first electrical quantity which is a function of the frequency of said first signal and a second electrical quantity which is a function of the frequency of said second signal, and combining said quantities to produce a third electrical quantity bearing a direct relationship to the angular position of said variable direction with respect to a predetermined reference direction.

2. In a telemetering system wherein a modulated radio frequency signal is radiated at one point and received at another, the method of controlling the angular position of a remotely located motor, comprising the steps of adjusting the magnitude of a first variable inductance in accordance with the sine of the angle between the angular position to be transmitted and a first reference direction, adjusting the magnitude of a second variable inductance in accordance with the sine of the angle between said angular position and a second reference direction, producing a first audio signal having a frequency which is a function of the magnitude of said first inductance, producing a second audio signal having a frequency different from said first audio signal and which is a function of the magnitude of said second inductance, amplitude modulating a radio frequency carrier with said audio signals, demodulating said carrier after radiation and reception thereof, separating the two audio components of said demodulated signal, producing a first direct control voltage the magnitude of which is a function of the frequency of the first audio component, producing a second direct control voltage the magnitude of which is a function of the frequency of the second audio component, producing first and second alternating voltages having effective magnitudes which are functions of the magnitudes of said first and second control voltages, respectively, generating a third alternating voltage having an effective magnitude which is a function of the effective magnitudes of said first and second alternating voltages, and applying said alternating voltages to a synchro motor to position, thereby the rotor thereof in accordance with the angular position represented by the adjustment of said variable inductances.

3. In a system for telemetering polar information from a first to a second location, apparatus comprising a first, second, and third voltage generator producing, respectively, first, second and third voltages the magnitudes of which are a function of an angle of displacement, said angle plus 120 degrees, and said angle plus 240 degrees, a first signal generator connected to said first voltage generator and producing a first audio signal the frequency of which is a function of the magnitude of said first voltage, a second signal generator connected to said second voltage generator and producing a second audio signal the frequency of which is a function of the magnitude of said second voltage, a radiation and receiving system transmitting said signals from said first to said second location, a first and second voltage source producing, respectively, a first and second output voltage, a first regulator connected to said receiving system and regulating the magnitude of said first output voltage as a function of the frequency of said first signal, a second regulator connected to said receiving system and regulating the magnitude of said second output voltage as a function of the frequency of said second signal, said first and second output voltages having the same relative magnitudes as the first and second voltages produced by said first and second voltage generators, and an indicator connected to said voltage sources and operated by said first and second output voltages and producing a physical indication of said angle of displacement.

4. Apparatus for telemetering polar information from a first to a second location comprising a first variable frequency audio signal generator including a variable inductance and producing a first alternating signal the frequency of which is a function of the value of said inductance, a control motor adjusting said first variable inductance to a value proportional to the sine of an angle of displacement between a variable direction (which is to be telemetered) and a first reference direction, a second variable frequency audio signal generator including a variable inductance and producing a second alternating signal which is a function of the value of said inductance, a control motor adjusting said second variable inductance to a value proportional to the sine of a second angle of displacement between said direction and a second reference direction, a radio frequency carrier wave generator, a modulator connected to said first and second audio signal generators and modulating said carrier wave with said signals, a transmitting antenna radiating the modulated carrier wave, a receiving antenna receiving said carrier wave, a receiver connected to said receiving antenna and amplifying and demodulating said carrier wave, a first and a second filter coupled to said receiver for separating said first and second audio signals, respectively, a first direct voltage generator connected to said first filter and producing a first direct voltage the magnitude of which is a function of the frequency of said first audio signal, a second direct voltage generator connected to said second filter and producing a second direct voltage which is a function of the frequency of said second audio signal, a first alternating voltage generator controlled by said first direct voltage and producing a first alternating output voltage having a magnitude which is a function of the magnitude of said first direct voltage, a second alternating voltage generator controlled by said second direct voltage and producing a second alternating output voltage the magnitude of which is a function of the magnitude of said second direct voltage, a third alternating voltage generator controlled by said first and second alternating output voltages and producing a third alternating output voltage having a magnitude which is a function of the magnitudes of said first and second alternating output voltages, and a synchro motor connected to said alternating output voltages the rotor of which is thereby controlled in accordance with said angle of displacement.

5. In a telemetering system for telemetering angular information from a first to a second location through an electrical channel wherein the remote indicator is a servo-type motor in which three angularly displaced electric fields control the position of a movable rotor, apparatus for remotely controlling said servo-type motor by the transmission of only two signals comprising, in combination, an angularly movable member whose position is to be telemetered, a first variable frequency oscillator under the control of said member and generating a first signal whose frequency is a function of the angle of displacement of said member from a predetermined reference direction, a second variable frequency oscillator under the control of said member and generating a second signal whose frequency is a different function of said angle of displacement of said member, means for relaying said first and second signals to said second location, means for converting said variable frequency signals, respectively, into third and fourth constant frequency alternating signals, the magnitudes of which are functions, respectively, of the frequencies of said first and second signals, means under the control of said constant frequency signals for producing a fifth constant frequency signal, and means coupling said third, fourth, and fifth signals to said servo-type motor thereby to control the position of its rotor in accordance with the angular position of said movable member.

OTTO H. SCHMITT.
WINFIELD E. FROMM.
WESLEY A. FAILS.
IRA L. KASINDORF.

REFERENCES CITED

The following references are of record in the file of this patent:

UNITED STATES PATENTS

| Number | Name | Date |
|---|---|---|
| 1,606,792 | Isles | Nov. 16, 1926 |
| 1,941,615 | Mirick | Jan. 2, 1934 |
| 2,179,265 | Luck | Nov. 7, 1939 |
| 2,319,965 | Wise | May 25, 1943 |
| 2,379,694 | Edson | July 3, 1945 |
| 2,404,238 | Loughlin | July 16, 1946 |
| 2,405,568 | Ferril | Aug. 13, 1946 |
| 2,407,270 | Harrison | Sept. 10, 1946 |
| 2,432,772 | Lear | Dec. 16, 1946 |
| 2,455,618 | Shepard | Dec. 7, 1948 |
| 2,462,117 | Mikkelson | Feb. 22, 1949 |